US007783634B2

(12) United States Patent
Iwayama et al.

(10) Patent No.: US 7,783,634 B2
(45) Date of Patent: Aug. 24, 2010

(54) DEVICE, A PROGRAM AND A SYSTEM FOR MANAGING ELECTRONIC DOCUMENTS

(75) Inventors: Makoto Iwayama, Tokorozawa (JP); Hisashi Ikeda, Kunitachi (JP); Naohiro Furukawa, Tachikawa (JP); Yusuke Sato, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 231 days.

(21) Appl. No.: 11/489,569

(22) Filed: Jul. 20, 2006

(65) Prior Publication Data

US 2007/0112841 A1    May 17, 2007

(30) Foreign Application Priority Data

Nov. 14, 2005    (JP)    ............................. 2005-328251

(51) Int. Cl.
  *G06F 17/30*    (2006.01)
(52) U.S. Cl. ....................................... 707/730; 707/748
(58) Field of Classification Search ................. 707/102, 707/3, 2
  See application file for complete search history.

(56) References Cited

U.S. PATENT DOCUMENTS

| | | | | |
|---|---|---|---|---|
| 5,832,474 | A * | 11/1998 | Lopresti et al. ................. | 707/2 |
| 5,960,448 | A * | 9/1999 | Reichek et al. ............. | 715/236 |
| 6,396,598 | B1 * | 5/2002 | Kashiwagi et al. .......... | 358/474 |
| 6,665,836 | B1 * | 12/2003 | Wynblatt et al. ............ | 715/205 |
| 2002/0143871 | A1 * | 10/2002 | Meyer et al. ................ | 709/204 |
| 2003/0226112 | A1 * | 12/2003 | Murata ....................... | 715/517 |
| 2005/0097096 | A1 * | 5/2005 | Silverbrook et al. ........... | 707/3 |
| 2005/0192920 | A1 * | 9/2005 | Hodge et al. .................... | 707/1 |
| 2005/0246351 | A1 * | 11/2005 | Hadley et al. ............... | 707/100 |
| 2005/0257140 | A1 * | 11/2005 | Marukawa .................. | 715/513 |
| 2006/0036588 | A1 * | 2/2006 | Frank et al. .................... | 707/3 |
| 2007/0229660 | A1 * | 10/2007 | Yamaguchi ................. | 348/143 |
| 2008/0141117 | A1 * | 6/2008 | King et al. .................. | 715/238 |

FOREIGN PATENT DOCUMENTS

| | | |
|---|---|---|
| JP | 07-319873 | 2/1995 |
| JP | 2000-285134 | 3/1999 |
| WO | WO 01/71473 A1 | 3/2001 |

* cited by examiner

*Primary Examiner*—John R. Cottingham
*Assistant Examiner*—Mohammed R Uddin
(74) *Attorney, Agent, or Firm*—Stites & Harbison, PLLC; Juan Carlos A. Marquez, Esq

(57) ABSTRACT

A device for recording positions within an electronic document and capable of recreating those recorded positions afterwards even if the electronic document has been changed to some extent. An index data creation unit in an information terminal creates index information for a page to display from the electronic document, and records it along with time information in an index database. When a time is specified, the index data search unit searches the index database for index information recorded near that time, and identifies the page position of that electronic document from the searched index information. A data display unit displays the beginning of the electronic document at the identified position. The information terminal is capable of managing information by linking electronic data from handwritten information written on paper with a digital pen, with the display page the electronic document by utilizing a stroke set database and a pen data processor.

21 Claims, 13 Drawing Sheets

FIG. 3

TABLE OF INDEX DATA 110

| URL | file:///c:/home/user1/.資料1.doc | 111 |
| TIME | 2004/11/27 10:02:14 | 112 |
| NUMBER OF INDEX | 10 | 113 |

| SET OF INDEX | INDEX STRING | ORDER OF OCCURRENCE | 114 |
| | "東京都" | 8 | |
| | "研究" | 1 | |
| | "購入した" | 2 | |
| | ⋮ | ⋮ | |
| | "本" | 13 | |

114A   114B

TABLE OF STROKE SET  240

| | | |
|---|---|---|
| ID OF STROKE SET | SS593032 | 241 |
| ID OF PEN | US000235 | 242 |
| ID OF DOCUMENT | DC028428 | 243 |
| TIME WHEN WRITING BEGINS | 2004/11/27 10:11:15 | 244 |
| COORDINATES OF RECTANGLE | (8.3, 65.8) - (55.2, 111.6) | 245 |
| NUMBER OF STROKES | 16 | 246 |
| STROKE 1 — NUMBER OF SAMPLES | 4 | 247A |
| STROKE 1 — SERIAL IDS OF SAMPLES | 1 TO 4 | 247B |
| STROKE 2 — NUMBER OF SAMPLES | 5 | |
| STROKE 2 — SERIAL IDS OF SAMPLES | 5 TO 9 | |
| STROKE 3 — NUMBER OF SAMPLES | 3 | |
| STROKE 3 — SERIAL IDS OF SAMPLES | 10 TO 12 | |
| ... | ... | |

247 brackets the STROKE rows.

FIG. 10C

| 251 | 252 | 253 | 254 |
|---|---|---|---|
| SERIAL ID | X COORDINATE | Y COORDINATE | TIME |
| 1 | 8.3 | 86.8 | 0.00 |
| 2 | 15.8 | 83.4 | 0.25 |
| 3 | 30.3 | 80.5 | 0.50 |
| 4 | 45.1 | 75.4 | 0.75 |
| 5 | 25.5 | 65.8 | 2.50 |
| 6 | 25.7 | 75.6 | 2.75 |
| 7 | 26.5 | 90.6 | 3.00 |
| 8 | 25.9 | 110.5 | 3.25 |
| 9 | 26.5 | 123.5 | 3.50 |
| 10 | 14.5 | 88.9 | 4.75 |
| 11 | 15.0 | 97.3 | 5.00 |
| 12 | 16.5 | 101.9 | 5.25 |
| | ... | ... | |

TABLE OF STROKE COORDINATES  250

DEVICE, A PROGRAM AND A SYSTEM FOR MANAGING ELECTRONIC DOCUMENTS

CLAIM OF PRIORITY

The present application claims priority from Japanese application JP 2005-328251 filed on Nov. 14, 2005, the content of which is hereby incorporated by reference into this application.

FIELD OF THE INVENTION

The present invention relates to a device for managing electronic documents and relates to technology for searching for and recording a display position on the electronic document.

BACKGROUND OF THE INVENTION

Along with the spread of electronic mail, electronic documents and the WWW, the task of extracting and managing just the necessary information from electronic documents, electronic mail and web pages has increased. Just the necessary information must frequently be recorded such as writing in a memo-book the location and the time where a conference is being held from electronic mail about a future conference (example 1); writing down on paper a portion of an interesting web page (example 2); or writing a portion of measurement values from an electronic file of experimental data into experiment memos (example 3). In any case, secondary information such as memos must be made from primary information comprised of the original electronic file.

However not all of the primary information is being recorded as secondary information so that in many cases a user will want to refer to primary information from the secondary information. In example 1, a user may want to check the original electronic mail to find information other than the location and day of the conference, such as sender of the conference invitation mail and the objective of the conference. In example 2, the user may want to again check the contents of the web page comprising the source of the information. In example 3, the user may want to check the electronic file of experimental data in order to reevaluate the values measured in the experiment later on.

In these type of situations where referring to primary information from the secondary information, the user must be able to access and pinpoint primary information in page units rather than in document units, in cases where the primary information is a long document or a long web page.

Devices for forming index information such as keywords in documents and periodical information incorporate technology for automatically forming timing index information such as for saving document files and closing document display windows. These devices also include technology for copying a page each time the WWW page of a new URL is displayed, and linking that page to index information for that page, and storing it (See for example, JP 2000-285134 A).

These devices also include technology for linking a specified, defined word sequence (string) with page information on where that sequence appears and recording it into a table. This technology is equivalent to automatically forming an index of electronic documents (topic list) (See for example, JP 1996-319873 A).

Technology has also been contrived for a pen type input device (digital pen) capable of electronically acquiring the track of the pen tip in order to enter memos or memos on paper as secondary information. The digital pen may for example be technology such as the "Anoto Pen" developed by the Anoto company of Sweden (See for example, W0 01/71473).

SUMMARY OF THE INVENTION

When dealing with long electronic documents or web pages, the user wants to be able to pinpoint a desired location in page units rather than in document units.

The technology disclosed in JP 2000-285134 A is not capable of directly accessing the page the user wants to view, when forming index information in document units.

The device of JP 1996-319873 A on the other hand, was capable of linking a title as index information with the page of that title in order to search and retrieve a page for viewing by the user. However this technology could not move from a predetermined small number of title information to the page desired by the user.

Moreover the technologies in JP 2000-285134 A and JP 1996-319873 A disclosed no means for linking secondary information such as memos or memos on paper, with primary information such as the electronic document being viewed.

On the other hand, the simplest method among technology for recording the page position was a method to record the absolute position of the word sequence (string) from the beginning of the document. However, this method could not be adapted to changes in the document layout or changes in the document.

Another method implanted a marking tag within the document. This method possessed the disadvantage that it changed the format of the document itself. Changing the primary information document just for the purpose of recording the position should be avoided due to document management problems.

Yet another method, copied each page of the primary information that was changed and recorded the copy along with page information. However the problem point with this method was the storage capacity. Moreover, managing the document versions was difficult.

These specifications give a simple description of the representative concept of the disclosed invention as follows.

During viewing of the electronic document, a symbol string appearing on the page displayed in the electronic document and an appearance sequence number expressing in what number from the beginning of the document that the symbol string appeared; are paired together as the index, and one or multiple indices appearing on the applicable display page are recorded as identification information to specify the electronic document.

A search is also made of one or multiple index data based on the search conditions that were input, and display positions within the electronic document linked to the searched index data are identified (indexed) and displayed.

This invention allows the user to easily later access a location for viewing on the original electronic document after the time that it was viewed, by recording a page position within the electronic document such as by writing a memo while viewing the electronic document. Moreover, the user can accurately access the viewing location even if changes were made in the electronic document in the period between the time the electronic document was viewed and the time a search was made from the memo.

BRIEF DESCRIPTION OF THE DRAWINGS

FIG. 3 is a diagram of the index data table;

FIG. 10C is a block diagram of the stroke coordinate table;

DETAILED DESCRIPTION OF THE PREFERRED EMBODIMENTS

Figure 1:
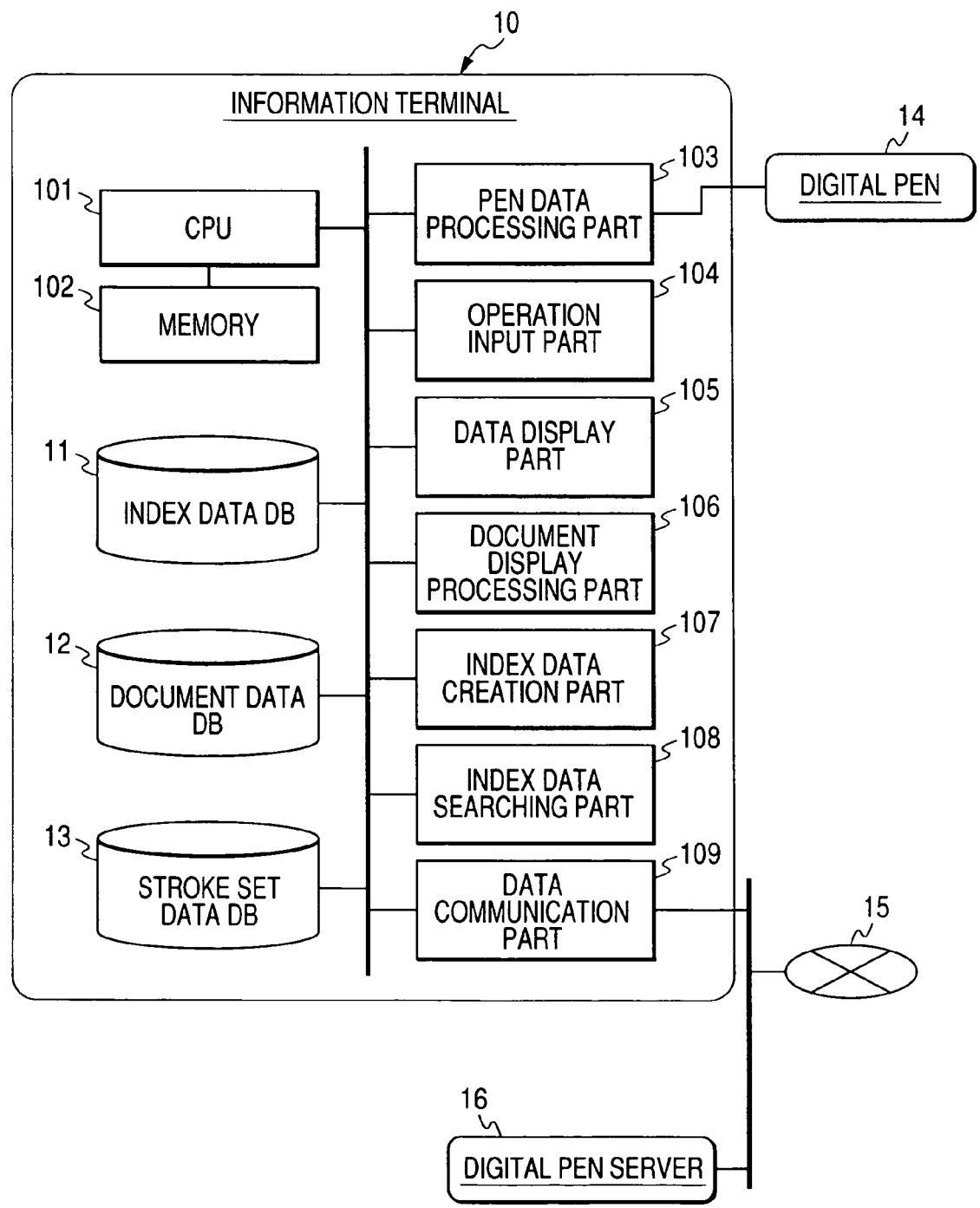
FIG. 1 is a block diagram of the information terminal and the entire system for managing electronic documents.

The embodiment of this invention is described while referring to the drawings. The embodiment is characterized in that page information viewed during viewing of the document is recorded, and when later recreating that page, that page can then be recreated as recorded, even if some changes were made in the electronic document after the time that it was viewed.

FIG. 1 is a block diagram of the document management system of the embodiment of this invention. The main part of this drawing shows an information terminal 10. The core of the document management system is the information terminal 10. The information terminal 10 connects via a network to a digital pen server 16 and an external network 15. The information terminal 10 also connects to a digital pen 14. The information 10 and the digital pen 14 may be connected via cable using a protocol such as USB; or may be connected by a wireless means such as Bluetooth, wireless LAN, cellular telephone systems, or infrared, etc.

A CPU 101 performs processing of various types by calling up and executing programs of different types stored in a storage device (not shown in drawing).

A memory 102 provides a work area for temporarily storing data that the CPU 101 uses in the various types of processing. The memory 102 also temporarily stores the data sent from the digital pen 14, the digital pen server 16, and the external network server 15.

The pen data processor 103 communicates by cable or wireless (radio) with the digital pen 14, and collects physical data acquired by the digital pen. The pen data processor 103 also acquires by communication between the digital pen sensor 16 and the digital pen, the document ID left on the memo and coordinate information on that document, forms stroke set data, and accumulates it in a stroke set database DB13. When making a search, the pen data processor 103 also searches for stroke set data matching the information specified by the digital pen 14 from the stroke set data DB.

An entry unit 104 is for example a keyboard or mouse and is utilized by the user as a means to enter information.

A data display 105 is for example a liquid crystal display, and displays the document contents, etc.

A document display processor 106 carries out processing for displaying the document data. The document display processor 106 may also utilize pre-existing document display software or a web page browser.

An index data generator 107 links to the document display processor 106, forms index data relating to a page currently appearing on the display, and accumulates it in the index database DB11.

An index data search unit 108 searches for index data in the index database DB11 based on the search conditions that were input and restores the document display position from the index data obtained in the search.

A data communications unit 109 is a network interface. The data communications unit 109 is for example made up of a LAN card capable of communication using a TCP/IP protocol. The data communications unit 109 allows the information terminal 10 to communicate with the digital pen server 16 and the external network 15.

An index database DB11 is a database that accumulates and searches the index data.

A document database DB12 is a database that accumulates and searches data relating to a document.

A stroke set database DB13 is a database that accumulates and searches the stroke set data.

An already existing relational database may be utilized for the index database DB11, the document database DB12 and the stroke set database DB13. Instead of the information terminal 10, these databases may be installed on one or multiple servers via a network.

The digital pen server 16 is a server for acquiring the document ID and coordinates on the document from data obtained by the digital pen 14. The information terminal 10 may contain the digital pen server 16.

Figure 2:
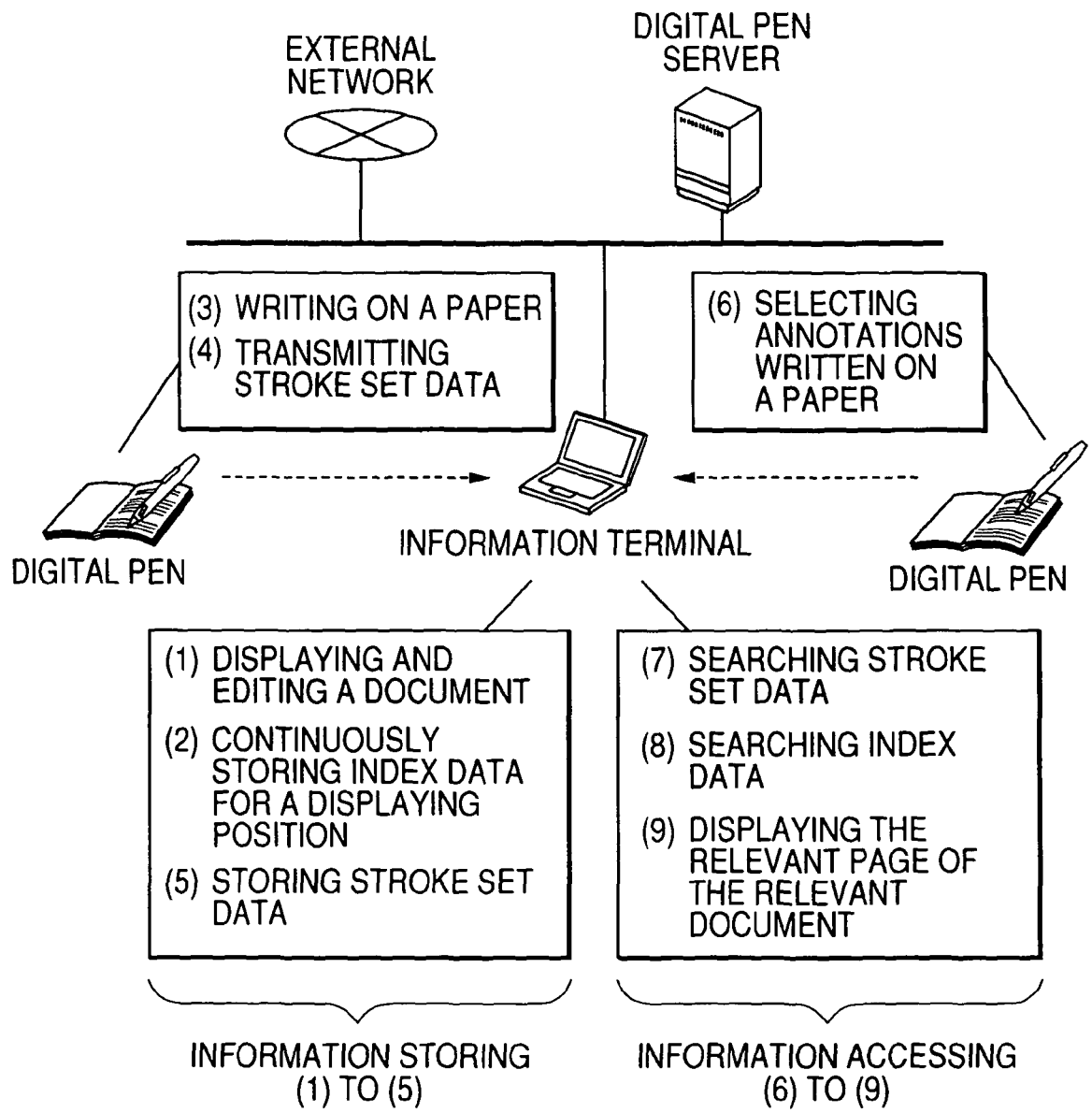
FIG. 2 is a concept diagram of the entire system for managing electronic documents.

FIG. 2 is a concept diagram of the entire system for managing electronic documents in the embodiment of this invention. This embodiment is separated into an information collection phase and an information access phase.

The information collection phase process ((1) through (5)) is described first. The state assumed for the information collection phase is that the user is making memos (memos) on paper with a digital pen while viewing and editing a document.

The process first displays or edits the document in the information terminal (1). The document may be a document accumulated in the information terminal or may be a document on the external network. The user makes memos with a digital pen on the paper (memos) at hand while viewing the document on display (3). The information terminal on the other hand, generates and accumulates index data relating to the document display position based on defined rules by the unique method of this invention (2). The process then transfers the memo (memo) information written by the digital pen as stroke set data to the information terminal (4), and the information terminal accumulates this transferred stroke data (5). The digital pen server communicates with the information terminal as needed.

The information access phase process ((6) through (9)) is described next. The description of the information access phase assumes a state where the user specifies a memo with the digital pen, and a search is made for the document displayed at the time written in the memo and the (document) display location.

The user first specifies a memo on paper with a digital pen (6). When this information is sent to the information terminal, the information terminal searches for stroke set data relating to the specified memo (7). The time written on the specified memo is also known because the stroke set data in the search results contains entry time information. A search is then made for index data on which the time entered on the memo is recorded (8), and the source information (URL) of the document and viewing position are restored from the searched index data. Finally, the information terminal displays the applicable page of the applicable document (9).

This invention is therefore capable of pinpointing the applicable page of an electronic document by the user specifying a memo for a search made via the time written in a memo when that document was viewed. Moreover, a search can still be made for the desired position even if a certain amount of corrections were made in the period from the writing of the memo, up to the search made from that memo.

The information collection phase and an information access phase are described in detail while referring to the FIG. 3 through FIG. 10.

The index data formed in the information collection phase is first described.

FIG. 3 is a drawing showing the structure of the index data table. This index data table 110 defines the index data stored in the index database DB11 contained in the information terminal 10.

A URL111 records the document source information in a URL format. The document may be a local file within the information terminal 10, or may be a file on an external network.

A time 112 is the time that an event was generated for forming this index data.

The index number 113 is the number of indices that the index data contains. The number of indices formed may be one or multiple elements. This number may also be specified in advance or dynamically. The user can freely change the processing speed by setting the number of indices.

An index set 114 is a collection of indices. The index set 114 contains the number of indices specified in the index number 113. Each index is made up of a pair comprised of an index character string 114A and an order of occurrence 114B.

The index string 114A is a character string selected by a certain standard, from a page (set as page P) displayed at the time point in the time 112. A detailed description is given later on. The character string may be a character string actually displayed in the page, or may be tag information or notation information invisible to the eye and embedded into the page. The character string may also be numbers or symbols, still images, audio, or moving images embedded in the page. These are referred to collectively as the symbol string.

The order of occurrence 114B expresses what number the index character string 114A appearing within a page P occurs, counting from the beginning of the document. In other words, this is the number order (sequence number) when counting only the target character strings. It is not the sequence number when counting all character strings from the beginning of the document. In the example in FIG. 3 for instance, the index character string and order of occurrence are "Tokyo-to" and "8". This signifies that the "Tokyo-to" on a page P, is the eighth time that "Tokyo-to" appears counting from the beginning of the document. In other words, "Tokyo-to" appeared 7 times prior to the page P. Likewise, "Research" and "1" indicate that the character string "Research" is the first time that this character string appears in this document. Of course an index can also be made for numbers and symbols in the same way. Moreover, if utilizing images as the index, then a standard for example of a color composition of 70 percent or more can be established as a reference or standard the image must satisfy. An order of occurrence expressing how many times only images satisfying that standard appeared from the start of the document can also be made the index. A specified standard (or reference) can also be established that utilizes audio or moving images as the index.

If there are multiple identical index strings 114A within a page P, then one order of occurrence for an optional character string can be selected. The selection can also be made based on a specific rule (definition) so that the order of occurrence (number) for a character string appearing at the beginning within page P is utilized. The problem of multiple identical character strings appearing in the index set can in this way be eliminated and the memory capacity of the index database DB utilized effectively.

Forming the index data in this way, allows searching, pinpointing and displaying the viewed location, even if a certain amount of changes were made later on after the document was viewed.

Figure 4:
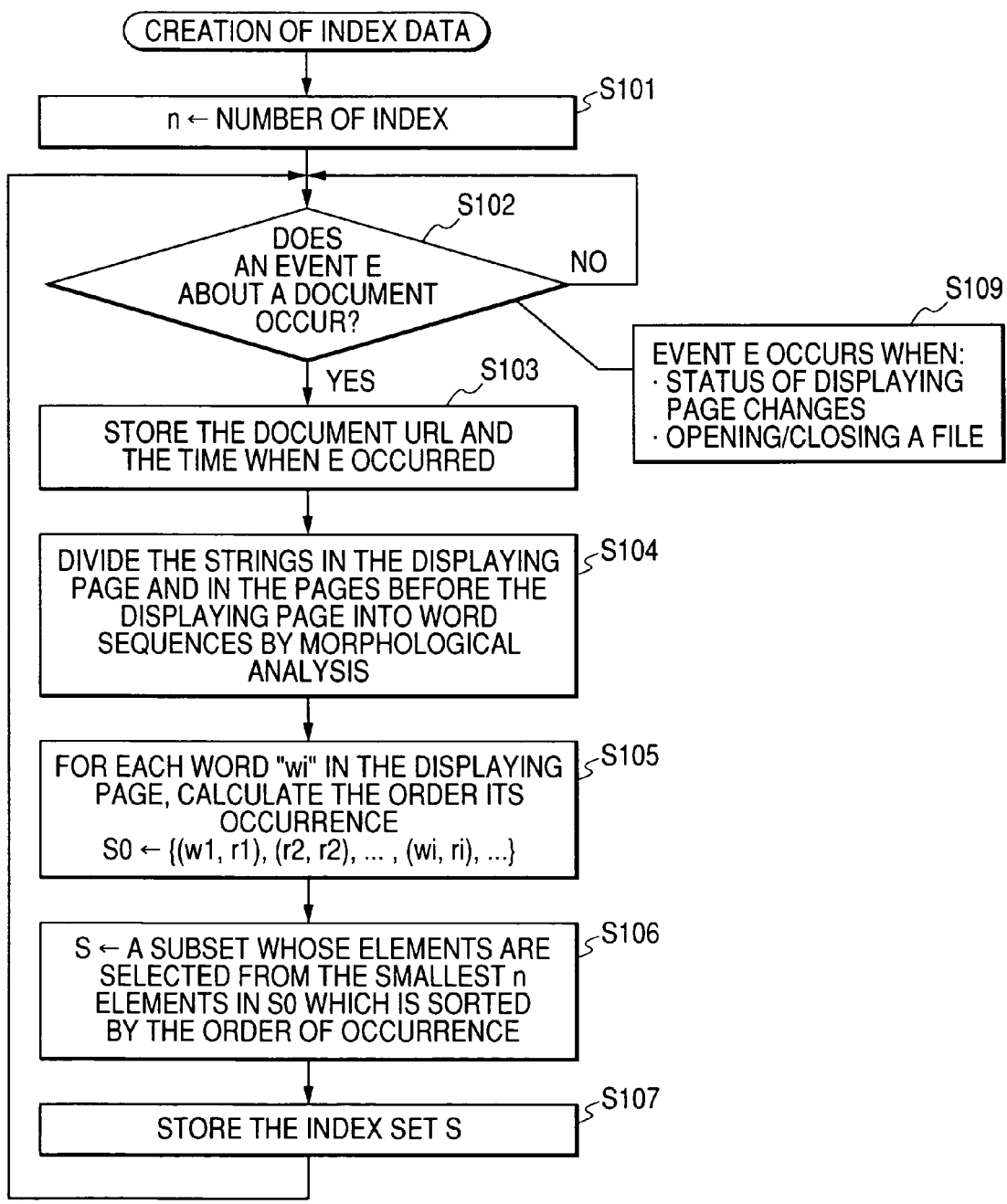
FIG. 4 is a flow chart of the process for forming the index data table.

FIG. 4 is a flow chart of the process for forming the index data defined in FIG. 3. This process is executed in the index data generator 107 of information terminal 10.

The index number is first specified (S101). In the case here, the index number is already specified but the index number may also be specified dynamically with a threshold as shown later on.

A check is next made to find whether an event E was generated for forming the index (S102). An event E is generated when a change was made in the state of the display page of the document. This embodiment utilizes the following two types of event E (S109).

The first type of event E relates to changes in the state of the display page, and occurs during movement within the document from scrolling the screen or a character string search, etc. This type of event is generated in the document display processor 106. If the same type of event such as from scrolling occurs consecutively within a short time then these may be grouped into one event if within a specified time, in order to reduce the required storage capacity.

The second type of event E is an event generated when documents are opened, closed or saved. This event is also generated in the document display processor 106. This type of event is necessary for recording timings such as the edit-start, end or temporary storage of a document file.

If an event E occurs then the following index data forming process is performed. If no event E occurs, then the operation returns to the event E occurrence decision process (S102). In other words, returns to a process equivalent to continual monitoring of events E.

When an event E occurs, the source information (URL) of the document where the event E occurred, and the time that the event E occurred are first of all recorded (S103).

Previous pages including the page being displayed are subjected to morphological analysis and subdivided into word strings (or word sequences) (S104). An already existing program is utilized in the morphological (analysis) program. If morphological results are already available, and if no changes were made in the document from that point onward, then the processing speed can be improved by utilizing those pre-existing morphological results.

After morphological analysis, the order of occurrence ri is calculated for each word wi contained in the page on display, and the index (wi, ri) is formed (S105). As already described, the order of occurrence ri expresses to what number (or the n-th time) the wi for the page on display appears, counting from the beginning of the document. All words for the index contained in the page on display are totaled and that set {(w1, r1), (w2, r2)} is made S0.

The sets S0 for all indices are then sorted in ascending order according to the order of occurrence of S0, and n subsets are selected starting from the smallest subset, the last index set that was recorded is set as S (S106), and recorded in the index database DB (S107).

The reasons for a selection that establishes priority according to a low order of occurrence (S106) are as follow. An object of this invention is to recreate the page position of a viewed page even if changes were made to some extent between the time the document was viewed and the search for that document. That position is therefore found by the majority of multiple indices (described in detail later on). The probability for recreating that viewed page position therefore becomes higher if there are no index character string additions or corrections on the page prior to the viewed page. Stated another way, the selected index character string is preferably a difficult to correct or difficult to add character string. The index character string selected in the embodiment of this invention does not often appear prior to the viewed page, and this can reduce the probability that that index character string will be deleted on pages prior to the viewed page. There is also less likelihood that difficult to handle index character strings will be added.

Another possible method here is setting only a threshold for the order of occurrence and selecting the indices in order of occurrences smaller than the threshold value; rather than for example selecting a number of indices that were predetermined in S101. In this way, only indices that will prove effective in the search are formed, so the accuracy of the search improves. That threshold can also be freely set as desired by the user. After recording the index set (S107, the operation returns to the event E occurrence decision process (S102).

There are other methods for selecting an index character string with unique characteristics for identifying the viewing page. One method for example is to select an index character string that appears often only in that particular page and does not appear often in the document as a whole. This method can be used to express the scale called TF·IDF that is often used in document searches. This method prevents using general words that often appear in the entire document as the index character string. General words (or general terms) also represent a hazard in that they are often utilized for insertions and deletions.

If forming the index data speedily is important, then selecting index character strings randomly from the display page may be considered. In that case, some measure must be contrived so as not to select character strings that appear extremely often such as Japanese language helping verbs ("wa" "ga" etc.). Helping verbs and the previously described general words are used highly frequently so that selecting them as index character strings makes them easily susceptible to effects from insertion or deletion. Moreover, the processing speed can be improved by selecting index character strings in order from the beginning of the displayed page just per the number of indices that were formed.

The stroke data formed in the information collection phase is described next.

In this embodiment, a situation is assumed where the user is writing memos on paper with the digital pen 14 while viewing the document displayed on the information terminal 10, and that index data is accumulating in the information terminal 10. These are situations where for example, the user is searches for restaurant information via an external network 15 such as the WWW and writes telephone numbers listed on the search result page into a notebook, or writes especially valuable data from experiment data within the information terminal 10 into the user's experiment notes. An object of the embodiment of this invention is to directly access original information that is the source of a memo (note) even if changes were made to a certain extent in the document after the document was viewed. The effect is equivalent to directly accessing a restaurant page from the telephone number that was jotted down, or accessing the original file from a memo about the experimental data. Accomplishing this requires recording information left on the memo (note) by a digital pen. The embodiment of this invention, achieves an electronic memo by the user making entries with a digital pen on electronic paper.

Figure 8:
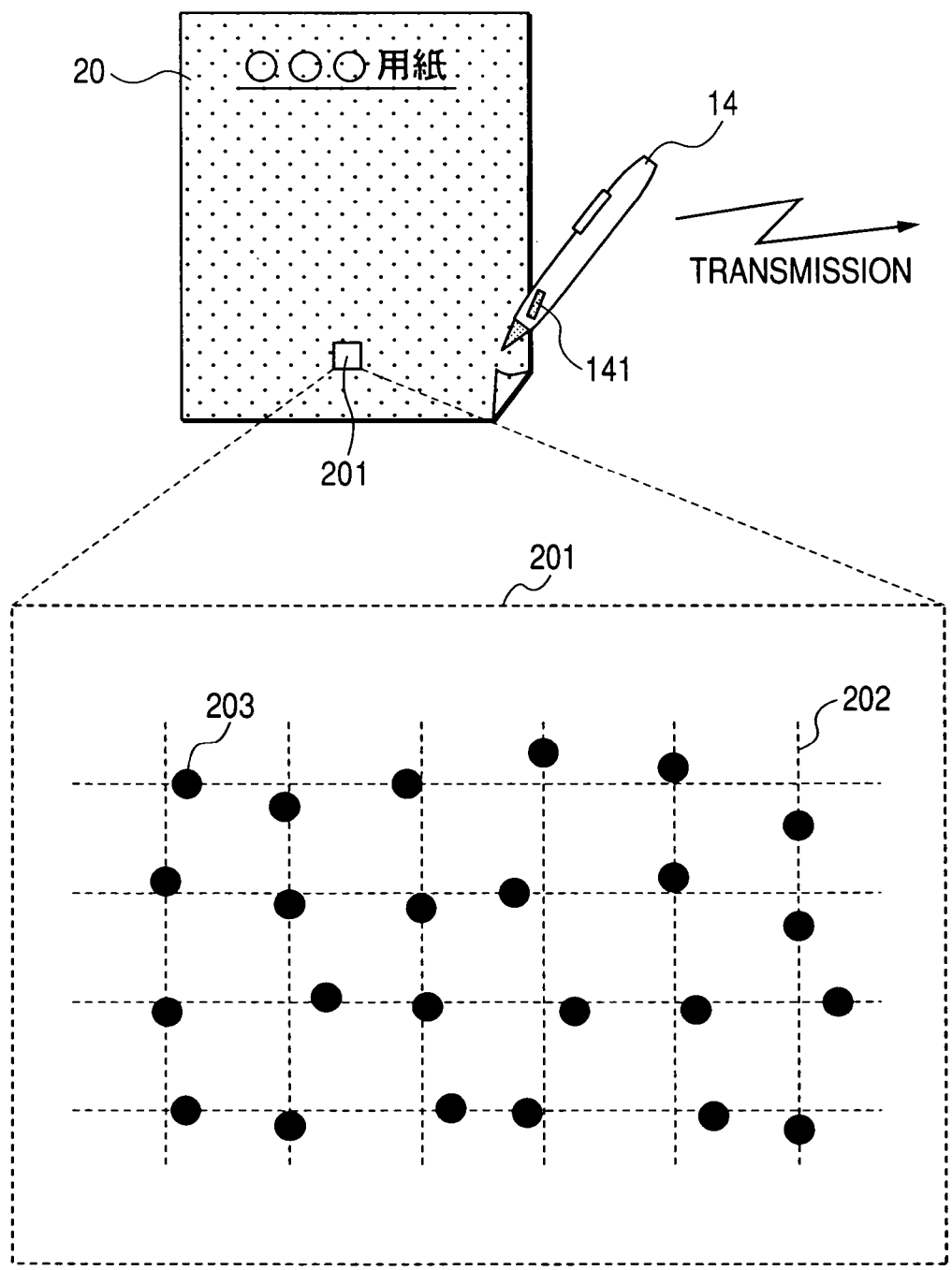
FIG. 8 is a drawing for describing the acquisition of coordinates from the paper surface by a digital pen.

FIG. 8 is a drawing for describing the acquiring of coordinates on the paper surface by using a digital pen 14 in the embodiment of this invention.

The digital pen 14 includes a CPU, a memory, a processor, a communication interface, a camera 41, a battery and a pen-pressure sensor. The digital pen 14 also contains a pen tip capable of writing letters and symbols on the paper surface with ink or black lead (graphite).

The digital pen 14 is utilized along with a paper 20 on which position detection dots 203 are printed. A section 201 of the paper 20 is shown enlarged here. Multiple dots 203 are printed on the paper 20. The dots 203 are printed at positions shifted to the left and right, and top and bottom from the intersection (reference point) 202 in an imaginary matrix.

Contact made with the paper by the pen tip is detected by the pen-pressure sensor when the user writes a character or a drawing on the paper. The digital pen 14 captures an image via the camera 141, of the dots 203 printed on the paper. The digital pen 14 for example, captures an image of an area include 6×6 dots 203.

The digital pen 14 utilizes the captured dot pattern, to finds absolute coordinate where the applicable dot pattern is present. These absolute coordinates are the coordinates where the applicable dot pattern is present within a wide, level area. Each dot printed on the paper possesses its own unique coordinates. Moreover, this wide, level area is a total area allowing all dot patterns to appear without overlapping each other.

The digital pen 14 sends the absolute coordinates that were found to the information terminal 10. The information terminal 10 receives the absolute coordinates in the pen data processor 103, and sends those absolute coordinates to the digital pen server 16. The digital pen server 16 specifies the position (document ID) on the paper surface within the wide, level area, and the coordinates (relative coordinates) on the paper surface of one sheet, and sends those specified relative coordinates to the pen data processor 103 of information terminal 10.

Acquiring the specified timing (for example, periodically) for the position information where the pen tip made contact, allows determining the pen tip movement. Information on the pen tip contact with the paper is acquired from a pen-pressure sensor included separately the digital pen 14.

Besides the absolute coordinates for the acquired dot pattern, the digital pen also sends the dot pattern image-capture time, and the pen ID to the pen data processor 103 of information terminal 10.

The digital pen server 16 need not be utilized for identifying the dot pattern ID and the relative coordinates. The position (relative coordinates) on the paper for example can be identified by using a tablet, etc.

Figure 9:
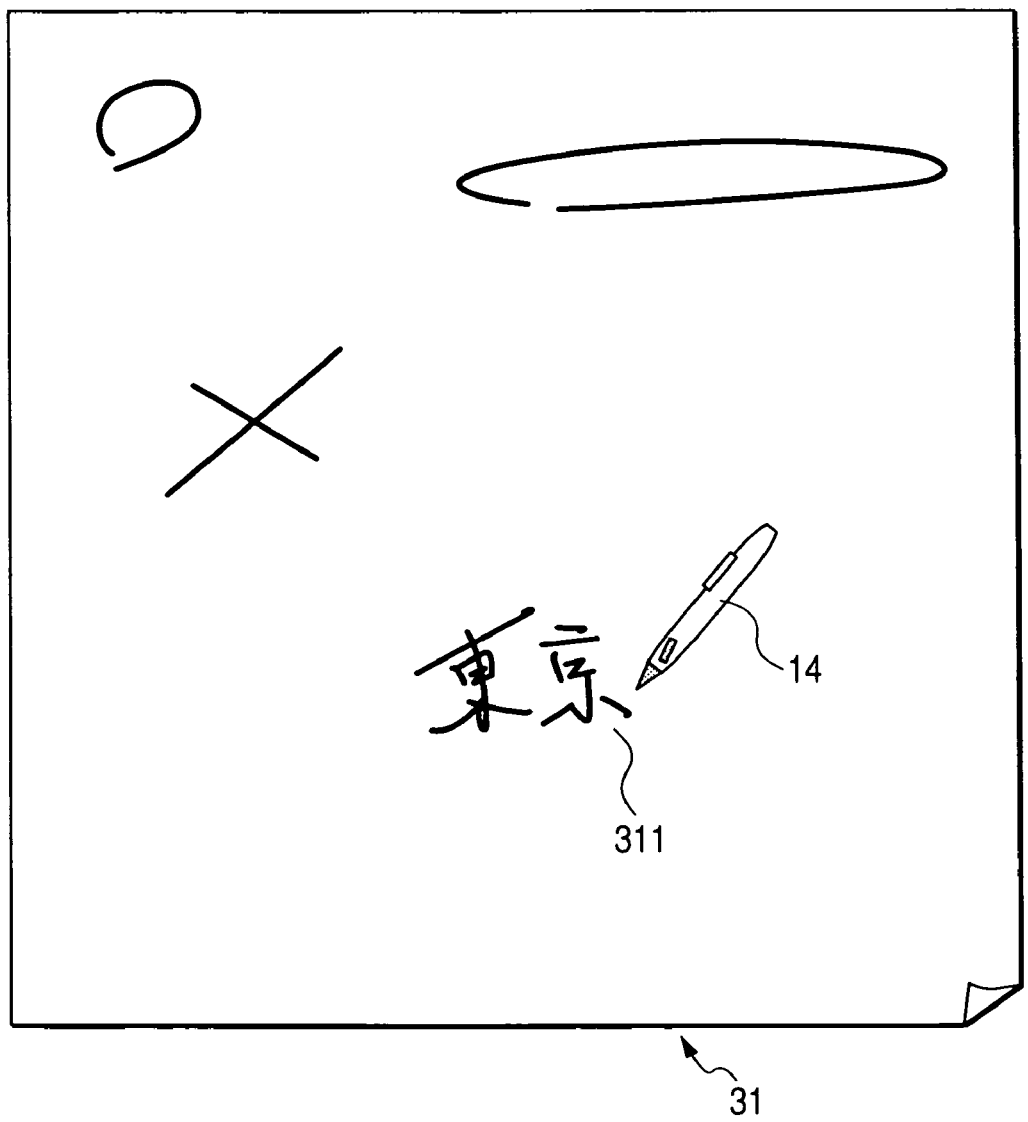
FIG. 9 is an example of a document on which information was written with a digital pen.

FIG. 9 shows an example of the memo 311 written with a digital pen 14 on the document 31 in the embodiment of this invention.

Dot patterns on the document 31 vary between respective documents. In other words, when printing documents, a different dot pattern is printed on each document. The document 31 may be a document made electronically with software for making a document or a handwritten document converted to an electronic media, and need not always be a document relating to the document that was viewed.

The user enters memo information (characters, symbols, etc.) 311 in the document 31 with the digital pen 14 while viewing the document and data displayed on the information terminal 10. Absolute coordinates for the position (position where pen tip made contact) where letters (etc.) were entered with the digital pen 14 as well as the time those absolute coordinates were measured are periodically acquired. The digital pen 14 next sends the acquired absolute coordinates and the acquired time to the information terminal 10.

The information terminal 10 receives data from the digital pen 14 via the pen data processor 103, and identifies the relative coordinates and the document ID corresponding to each of the absolute coordinates by making an inquiry to the digital pen server 16.

Figures 10A, 10B:
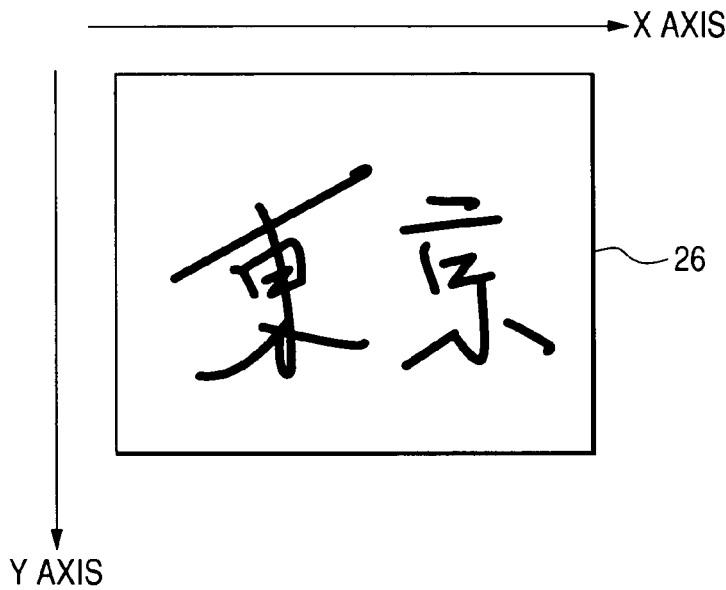
FIG. 10A is an example for describing the stroke set.
FIG. 10B is a block diagram of the stroke set table.

The pen data processor 103 decides the stroke of the information that was entered based on the relative coordinates that were specified and the measurement time, and forms stroke coordinate data (data defined in 250 of FIG. 10C). The stroke set data (data defined in 240 of FIG. 10B) is then formed using the specified document ID.

FIG. 10A is an example of the stroke set 26 in the embodiment of this invention.

The stroke set 26 shows the Chinese characters for "Tokyo" 311 shown in FIG. 9 that were entered with the digital pen 14. In this embodiment, the stroke position is determined as shown in the figure with the origin (reference) point at the upper left, the horizontal direction serving as the X axis, and the vertical direction serving as the Y axis. The stroke is collection (set) of strokes in the vicinity of the entered time and the coordinates and is identified based on the coordinates and time entry for each point.

FIG. 10B is a drawing of the structure of the stroke set table 240. The stroke table defines the stroke set data stored in the stroke set database DB13 contained within the information terminal 10 of the embodiment of this invention. A key for an optional element can be used to search the stroke set data.

The stroke set ID241 is identifiers for identifying the applicable stroke set data.

A pen ID242 is an identifier for the applicable stroke set that was entered by the digital pen 14.

The document ID 243 is an identifier for identifying the document on which the stroke set was entered.

The entry start time 244 is the time that entry of the applicable stroke set began.

The rectangular coordinates 245 are the rectangular area containing the applicable stroke set. The applicable rectangular coordinates 245 are relative coordinates for the document where the applicable stroke set is entered. This area is expressed by coordinates for the upper left edge and coordinates for the lower right edge of the rectangular area.

The number of strokes 246 is the number of strokes (lines) contained in the applicable stroke set. In FIG. 9 for example, the number of strokes in the Chinese characters for "Tokyo" is 16 (strokes).

The stroke set information 274 contains the number of sample (points) 247A and the serial number 247B.

The number of sample (points) 247A are the number of relative coordinates comprising the applicable stroke and are acquired by the digital pen 14.

The serial number 247B is an identifier for identifying the relative coordinates making up the applicable stroke and is acquired by the digital pen 14. The serial number 247B is a link to the stroke coordinate data 250 (FIG. 10C).

FIG. 10C is a drawing showing the structure of the stroke coordinate table 250 for defining the stroke coordinate data store in the stroke set database DB13 contained in the information terminal 10 of the embodiment of this invention.

The serial number 251 is an identifier for identifying the relative coordinates acquired by the digital pen 14.

The X coordinate 252 is a relative coordinate for the X coordinate shown in FIG. 10A, and is expressed for example in millimeters.

The Y coordinate 253 is a relative coordinate for the Y coordinate shown in FIG. 10A, and is expressed for example in millimeters.

The acquisition time 254 indicates the time that the applicable relative coordinates were acquired by the digital pen 14. In this descriptive drawing, the elapsed time from the entry start time is recorded in the acquisition time 254.

The description of the information collection phase is now complete. The information access phase is described next.

In the information access phase, the user specifies with a digital pen the memo information 311 entered on the document 31 where the information is already entered, and a search is made on the information terminal 10 for the document page displayed at the time entered on the specified memo information and it is then displayed.

To specify the memo information 311, the user picks a rectangular area of the memo information 311 with the digital pen 14. The absolute coordinates of the point that was picked is sent from the digital pen 14 to the information terminal 10. The entire memo information may also be enclosed by strokes. The user can in this way specify the memo information by an easy operation.

The information terminal 10 receives the absolute coordinates in the pen data processor 103, makes an inquiry to the digital pen server 16, and identifies the relative coordinates and the document ID linked to the absolute coordinates that were received.

The pen data processor 103 searches the stroke set database DB13 using the specified document ID and relative coordinates as a key. The pen data processor 103 holds the document ID 243 as the applicable document ID type, and acquires stroke set data so as to include the rectangular coordinates 245 in the applicable relative coordinates. Some type of countermeasure is required when multiple stroke set data have been acquired. A first method is to compulsorily decide on one of the stroke set data and proceed with the processing. Another method is to display the multiple stroke set data on the screen and allow the user to make a selection. A desired stroke set data can in this way be newly selected when the user has specified multiple memos, and the efficiency of the user's search is improved.

The pen data processor 103 acquires the entry start time 244 from the acquired stroke set data, and conveys the acquired entry start time 244 to the index search unit 108.

The index data search unit 108 specifies the document displayed at the applicable time in the information terminal 10 and the display page within the applicable document using the entry start time 244 as the search key conveyed from the pen data processor 103, and displays the applicable page of the applicable document on the information terminal.

Figure 5:
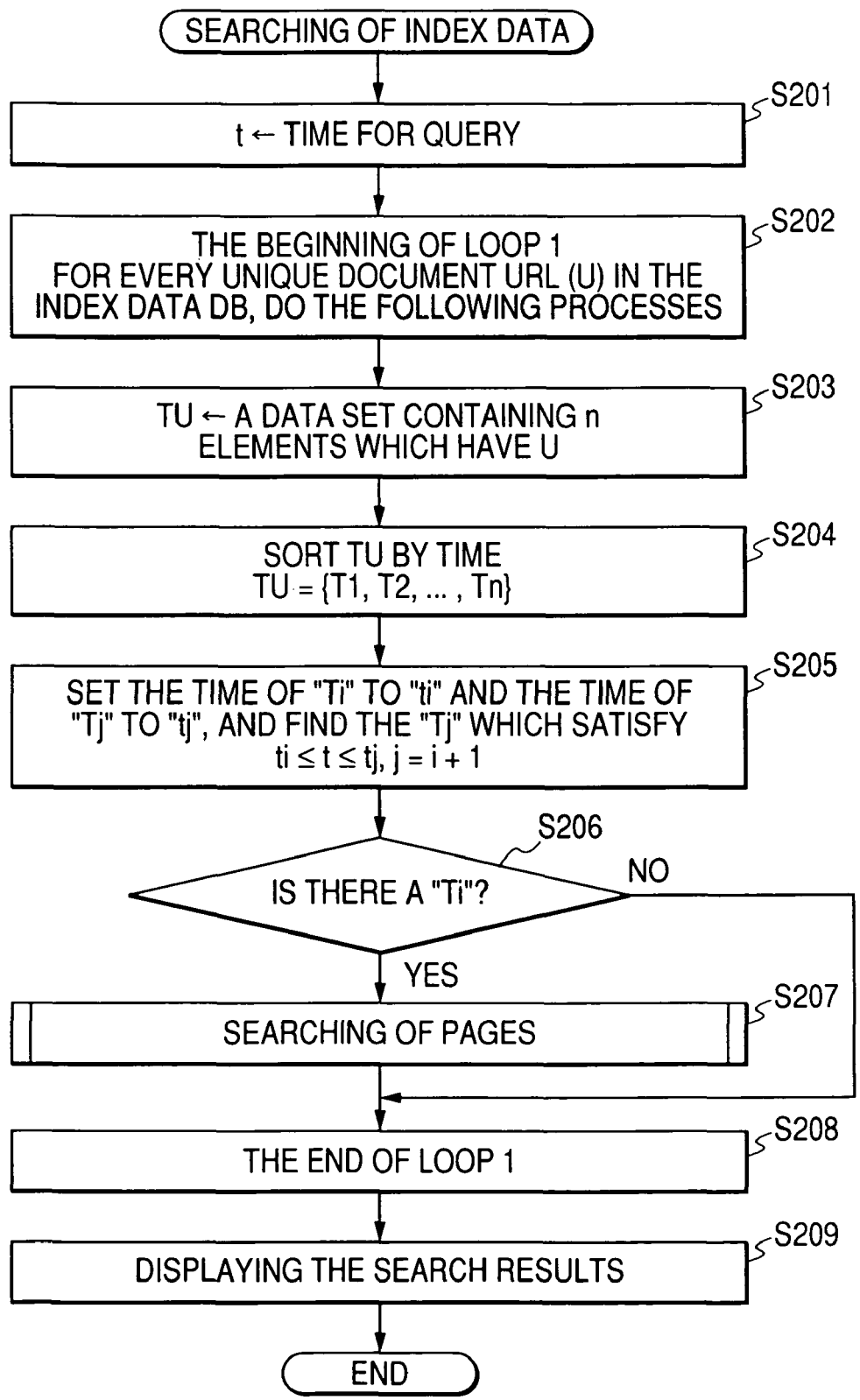
FIG. 5 is a flow chart of the index data search process.

FIG. 5 is a flow chart showing the index data search process for specifying the display page within the applicable document and the document that displayed at the applicable time from the entry start time conveyed from the pen data processor 103, and displaying the applicable page of the applicable document.

First of all, the entry time conveyed from the pen data processor 103 is set in t by the search key (S201).

A search is next made of the index database DB11, all document source information (URL) contained in the index database DB11 is acquired, and the following process (S203 to S207) executed for each URL (U) (S202).

All index data containing U as the URL are first of all collected, and the set of collected index data is set as TU (S203).

All the index data TU is next sorted in ascending order of the time 112, and the TU after sorting is set as; TU={T1, T2, ..., Tn} (S204).

The index data Ti within the TU of time 112 is set as ti, and the data Tj of time 112 is set in the same way as tj. A search is here made of TU for a Ti meeting the conditions of $ti \leq t \leq tj$ and moreover j=i+1 (S205). This search is equivalent to a search of index data recorded prior to the search key time t and also the time closest to time t.

If there are Ti satisfying the above conditions (S206), then the page search process is implemented (S207), and the search is terminated (S208). If there are no Ti satisfying the above conditions (S206), then the processing shifts to other documents. The search results are finally displayed (S209).

Figure 6:
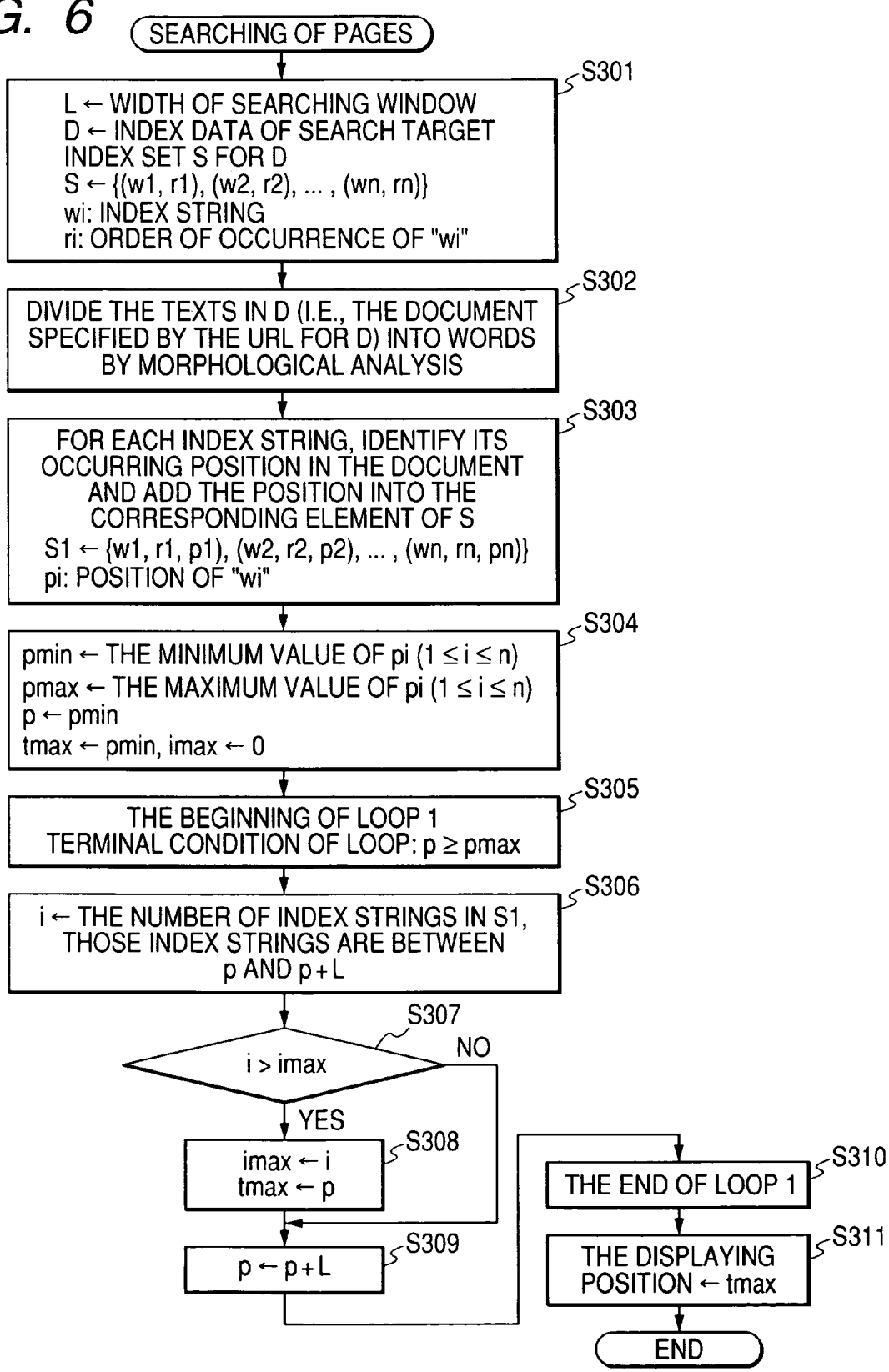
FIG. 6 is a flow chart of the page search process.

FIG. 6 is a flow chart of the page search process (S207) on the flow chart in FIG. 5. This process is executed in the index data search unit 108 contained in the information terminal 10.

The following initial settings are first of all made (S301). The window width is set as L, the index data for the search object is set as D, and the index set contained in D is set as S.

Here, L is the window width. In the process from hereon, a search is made for the page position while offsetting the window whose width is L. The L may be used to specify the page length specified in the document display program.

Here, D is the index data that was identified (indexed) in S205 in the index data search process (FIG. 5). In other words, D is the index data recorded in time t per the search key.

Here, S is the index set 114 contained in D, and is an index set made up of a pair comprised of the index (character) string 114A and the order of occurrence 114B. Here, S is displayed as {(w1, r1), (w2, r2), ..., (wn, rn)}. Here wi is the index character string, and ri is the order of occurrence for wi.

The page search process identifies the page position displayed at the time the index data D was generated based on the index set S contained in the index data D. The position of the subject page is searched while shifting the window whose width is L in order to identify the page position.

In the page search process, the document (document specified by URL111 of D) matching the index data D is acquired after the initial setting (S301), morphological analysis performed, and that document subdivided into word strings (S302). Pre-existing program is utilized as the morphological analysis unit.

The document is next scanned from the beginning, the position of each index character string (word) wi of index set S appears at the ri-th time is identified, and this position is set as pi. This position may for example be expressed as the number of bytes from the beginning. That identified position pi is then attached to each element of the index set, and a new index set S1 is formed (S303). Consequently, S1 is {(w1, r1, p1), (w2, r2, p2), ..., (Wn, rn, pn)}.

Here, the minimum value of ($1 \leq i \leq n$) is set in pmin, and the maximum value of pi ($1 \leq i \leq n$) is set in pmax (S304).

In the loop process from S305 to S310, the number of indices present within the current window is investigated while shifting windows whose width is L in the period from pmin to pmax. When the current window for example is a position from p to p+L, then the number of index i elements meeting the condition $p \leq pi < p+L$ within each index of index set S1, become the number of indices within the current window (S306). The number of indices may also be investigated from the beginning to the end of the document rather than only the period from pmin to pmax, however limiting the range of the search is helpful in boosting the speed of the search.

A search for the window containing the largest number of indices within the index set S1 is made while consecutively shifting windows in the period from pmin to pmax, and the start position of this window is stored in tmax. When there are multiple tmax, then the user may make an optional selection such as selecting the tmax nearest the beginning of the document as the window start position. In other words, the search results comprise window locations containing the most number of indices, rather than a general concept of the page when viewed.

When the loop process ends, the page position found with tmax is obtained (S311). The page position displayed at the time where the specified index data D is recorded can therefore be estimated by the majority of the multiple indices. Of course when the index data that was searched contains one index then that is the page found by the start position tmax window containing the index where the position was identified.

In the search process in FIG. 6, the page position is determined by the majority of the multiple indices so that the position of the page displayed during forming of the index can be recreated even if changes were made to some extent to the document. An example where the display page position is recreated even when document changes were made is described later on.

The description now returns to the explanation of FIG. 5.

In the index data search process of FIG. 5, if any of the documents were displayed at the search time t, when the loop process (S202 to S208) relating to each document was complete, then the page position displayed at the search time t can be obtained by the page search process shown in FIG. 6.

In the index data search process, the search results are finally displayed on the data display unit 105 of information terminal 10 (S209) based on the display page position information that was acquired in the page search (S207) and URL contained in the index data that was found.

Figure 7:
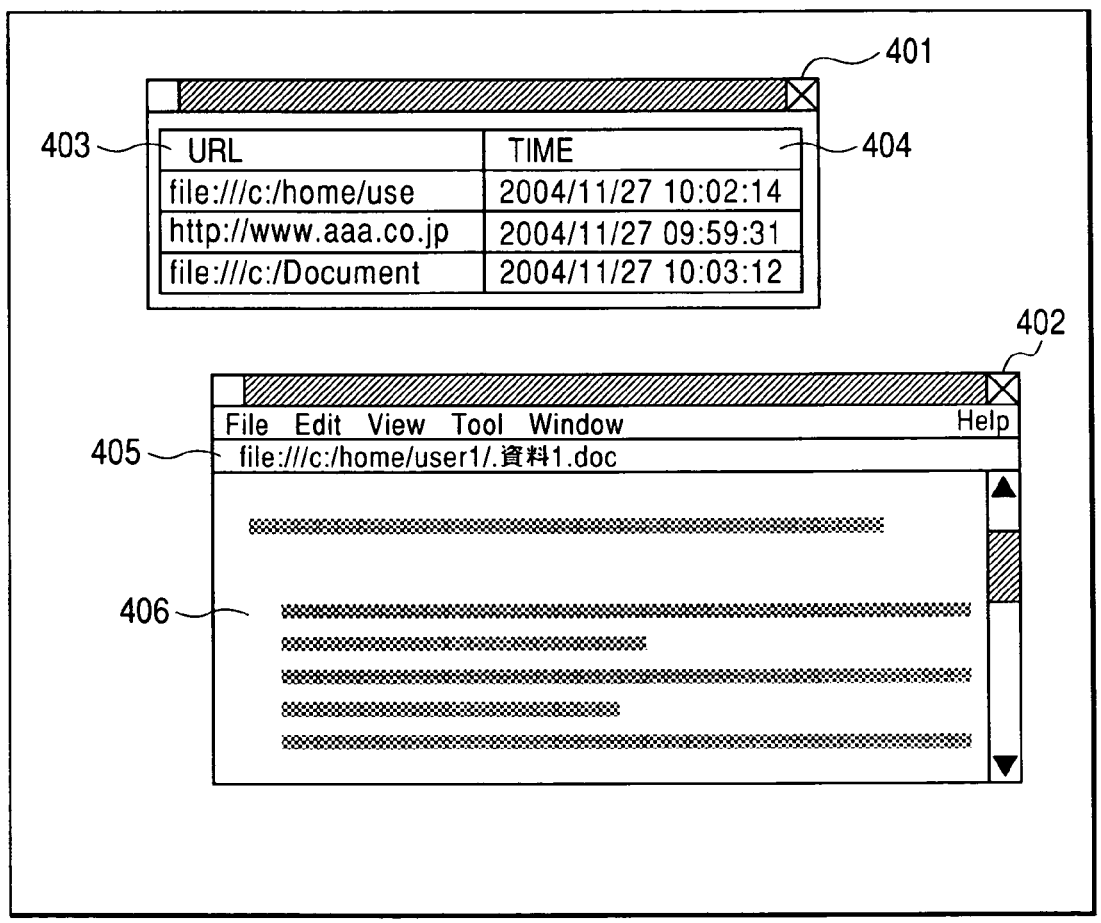
FIG. 7 is an example of the display on the search result screen.

FIG. 7 shows an example of search results displayed on the data display unit 105 contained in the information terminal 10 in the embodiment of this invention.

A document select window 401 displays the search results for each document as a pair made up of the URL 403 of the applicable document and the viewing time 404 of the applicable document. The user operates the entry unit 104 to select the desired document from this list.

The document display window 402 shows the documents selected by the user. Already existing document display software may be utilized by the document display window 402.

The URL 405 of the display document and the document contents 406 are displayed on the document display window 402.

The URL 405 of the display document is the URL of the document that the user selected.

The document contents 406 are the page position search results. In other words, the page position that was displayed at the time t written in the specified memo is found and displayed.

The embodiment of this invention was described above. The effects of this invention are described next while referring to FIG. 11 and FIG. 12.

Figure 11:
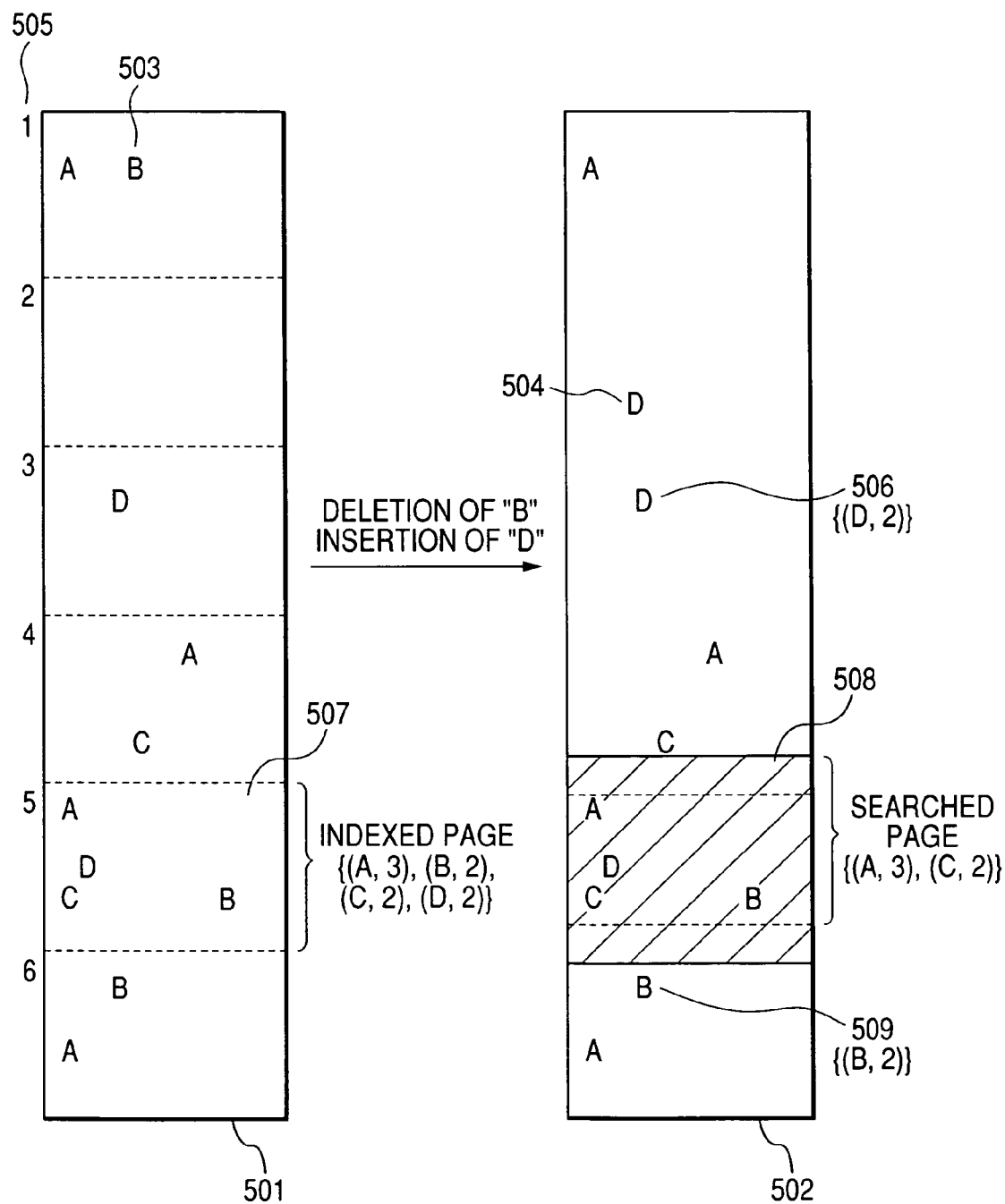
FIG. 11 is a diagram of an example for describing results versus changes made in the document content.

FIG. 11 is a drawing for describing how in the embodiment of this invention, the page position that was viewed when the memo was written can be recreated even when changes were made in the document referred to at the time the memo was written, in the period between entry (writing) of the memo to the time of the search.

In FIG. 11, the reference numeral 501 is a model of the document contents when entering a memo. Reference numeral 505 denotes the page number. The reference numeral 507 denotes the page viewed when entering a memo, and is the page where the index is applied.

The four words "A" "B" "C" "D" included in the indexed page 507 are set as index (character) strings. Examining the document 501 for the time the memo was entered, shows that the "A" contained in the indexed page 507 appears up to a third time counting from the beginning so the index becomes (A, 3). The other indices become (B, 2), (C, 2), and (D, 2) in the same way.

The character string "B" 503 on the first page is assumed deleted and the character string "D" 504 on the second page is inserted in the period from memo entry and searching from the memo.

The document contents during the search from the memo consequently become that as shown in 502.

What locations to position the respective indices {(A, 3), (B, 2), (C, 2), (D, 2)} generated when entering the memo are calculated for document 502 during the search made from the memo.

Changes made after entering the memo are the index positions relating to the deleted character string "B", and the inserted character string "D". As shown in FIG. 11, indices relating to "B" indicate positions specified in 509, and indices relating to "D" indicate positions specified in 506.

However, the other character strings "A" and "C" which were not deleted or inserted are specified at the same position as when the memo was entered so the majority of the results and the searched page indicate the position specified in 508. A page can therefore be recreated that contains the same index as when the memo was entered. The page search results are an optional window within the range of 508 shown in FIG. 11 so that the user can select a desired page from among multiple page search (searched page) candidates. The searched page in FIG. 11 is one example of that selection.

In view of the above description, one can see that selecting an index character string that is unlikely to be deleted or inserted increases the probability of recreating the page position versus editing. The embodiment of this invention therefore utilizes as index character strings, those character strings (words) that do not frequently appear in the page prior to the subject index page (S106 of FIG. 4).

Figure 12:
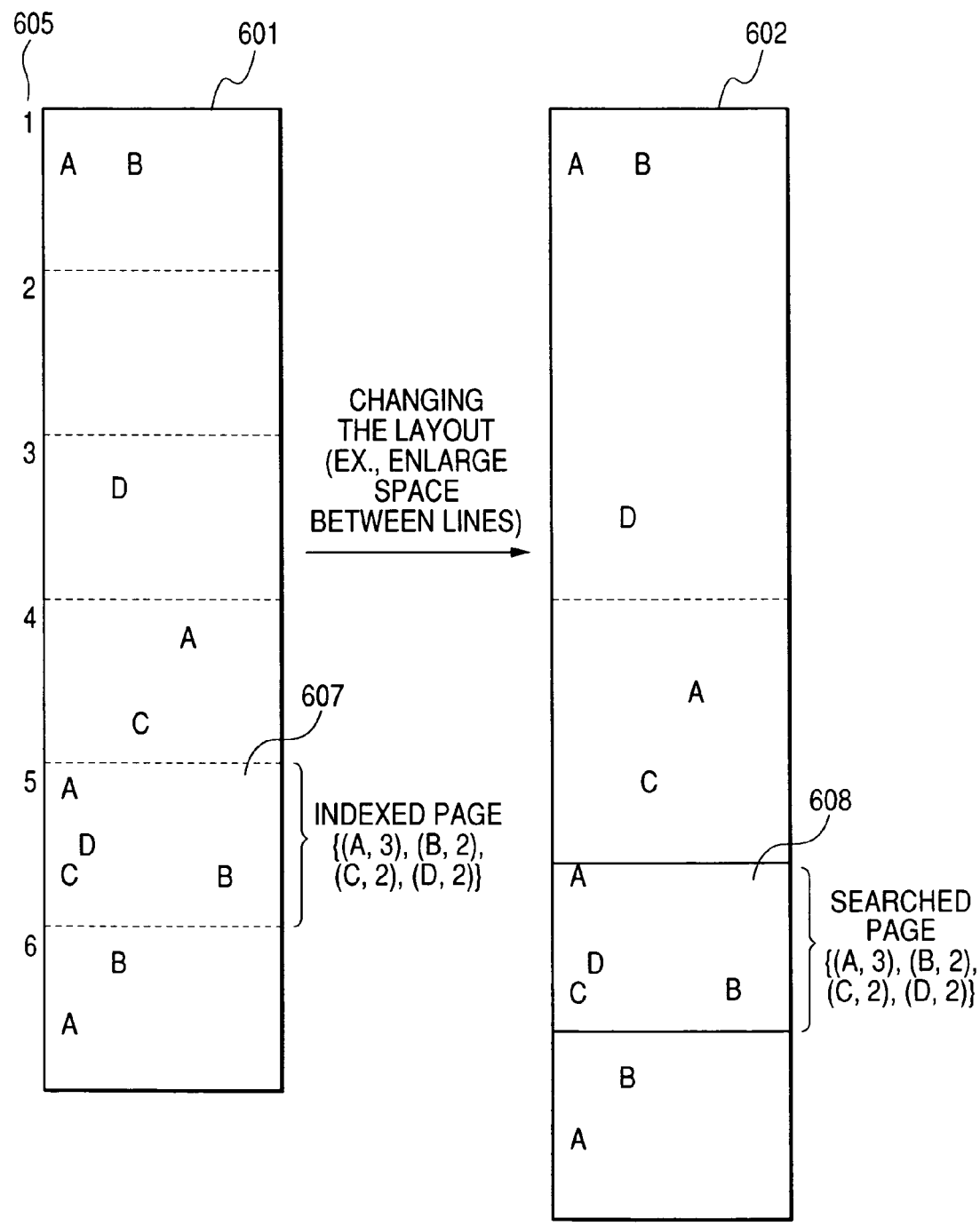
FIG. 12 is a diagram of an example for describing results versus changes made in the document layout.

FIG. 12 is a drawing for describing how the page position viewed during entering of the memo can be recreated in the embodiment of this invention, even when the layout information (space between lines) of that document was changed in the period from entering the memo and making a search from that memo.

In FIG. 12 reference numeral 601 is a model of the document contents at the time the memo was entered (written). Reference numeral 605 denotes the page number. Reference numeral 607 is the page that was viewed during entering (writing) of the memo and is the page that is the object of the index search (or indexed page).

The four words, "A" "B" "C" "D" contained in the indexed page 607 are the index character string. Examining the document 601 for the time the memo was entered, shows that the "A" contained in the indexed page 607 appears up to a third time counting from the beginning, so the index becomes (A, 3). The other indices become (B, 2), (C, 2), and (D, 2) in the same way.

The layout information for the entire document is next assumed to have been changed in the period from entering the memo and searching from the memo. In this case, the gap between lines is assumed to have been widened.

The document content for a search from the memo consequently then becomes that in 602.

What locations to position the respective indices {(A, 3), (B, 2), (C, 2), (D, 2)} generated when entering (writing) the memo are calculated for document 602 during the search made from the memo.

In the case in FIG. 12, the fifth page viewed when the memo was written is changed to the page indicated by 608 due to the effect from widening the line spaces and therefore the page indicated in 608 when a search was made from the memo must be identified in order to recreate the viewed position. Due to the effect from widening the space between lines, all of the indices indicate the page specified in 608. The majority of results and searched results of the page (searched page) are the page shown by 608. One can therefore see that the embodiment of this invention is capable of recreating the correct page even if the layout was changed. Of course even if the space between lines is widened, the page search results (searched page) as shown in FIG. 11 will be an optional window with the range determined by the majority of the results, however in FIG. 12 a particular window was selected as an example.

Besides changes in the page length, the embodiment of this invention can recreate the page position displayed prior to the change even if the paragraph grouping was changed or the font was changed.

The embodiment of this invention is also capable of recreating the indexed page even if a document display program used during the index search is different from the program used during forming of the index. The document display program used when forming the index, need only calculate to what number an optional (index) character string S appears when counting the S character string from the beginning of the document. The document display program utilized when searching the index need only calculate the position of the character string appearing on the N number. Both the document display programs share only the relative serial (or sequence) number information so that the page position can be recreated regardless of processing related to the rendering of the display program.

In the embodiment of the invention described up to now, a memo was written on paper by utilizing a digital pen 14, and this memo later specified, and a search made for the page position on the document displayed in the information terminal 10 and the time entered on that memo.

Another embodiment capable of recreating the page position without utilizing the digital pen 14 is described. This embodiment marks (records a mark) the page position on the displayed document with the information terminal 10, and the user later on selects a desired mark from a mark list, and the page position for that selected mark is then recreated.

In this embodiment, a menu or a button called "Record the page position" is prepared in the document display program, and the index data forming processing of FIG. 4 can then be executed at the point in time that this button or menu is selected.

However, S103 may be executed directly after S101 and the condition decision unit of S102 of FIG. 4 is not needed.

The index data for the time that the "Record the page position" was selected is accumulated in the index database DB11 within the information terminal 10 as the results from the index data forming process.

During the search, a list of index data accumulated in the index database DB11 within the information terminal 10 are displayed on a screen, and the user selects a target index data from that list. This operation is equivalent to showing a list of bookmarks provided to the user, and the user selecting a bookmark from that list, so the user can then select the desired index data.

The user may also specify a document URL or a time, and a search can then made for of the index database DB11 for index data satisfying the specified search conditions, a list of search results displayed, and the target index data then selected from the displayed list. This operation is equivalent to the user searching a list of supplied bookmarks and then selecting the desired bookmark from the search results. The act of the user specifying the time or the document URL serves to limit the range of the search of the index data. This operation reduces the number of displayed indices more than when merely displaying a list of accumulated index data, and the user can easily select the desired index data.

After selecting the index data the page search process in FIG. 6 is implemented. The page position and the page search determined from the results in FIG. 6 are displayed on document display window 402 on the display unit 105 in information terminal 10 as shown in FIG. 7.

When recording the page position, the user can specify or input a specified word and then save that word after linking it with index data on the recording page. During the search, a word search is made of registered related word groups, and the desired index data then acquired. When showing a list of index data, the words linked to each index data may also be simultaneously displayed, and the target index data selected by specifying a word from the displayed list. This operation is equivalent to the user placing a name on a supplied bookmark. When the user is searching for a desired page many titles and keywords that appear on that page may come to mind, and those keywords are frequently input as search conditions. The user can in this way make a search from a word, by searching for a target word from related registered word groups or by selecting a word displayed in a list of index data. Utilizing a widening scope of search conditions in this way will prove highly convenient for the user.

Moreover, an electronic document can be formed while referring to web pages, and the words appearing in that electronic document can be linked with the web page being viewed. After reading the web page, the user can then search web pages being viewed, by specifying words in the electronic document. The object to be referred to or created is of course optional and may for example be a web page, electronic document or electronic mail, etc.

Another embodiment of this invention, that automatically searches index data and the "Record the page position" (markings) of the previous embodiment is described.

This embodiment has the object of recreating an edited page position when next starting to edit that same document, by recording beforehand the page position where that previous editing was completed. This embodiment can also utilize different document edit programs, at the time the (previous) editing was completed, and at the time the editing is restarted.

The document edit program first of all executes the index data generating process of FIG. 4 when editing of the document has ended.

However, S103 may be executed directly after S101 and the condition decision unit of S102 of FIG. 4 is not needed.

The index data for the page when editing is ended is accumulated in the index database DB11 within the information terminal 10 as the results of the index data forming process.

When the document edit program has opened a document, a search is made from the index database DB11 for the very last (time-wise) index data that was recorded relating to that document.

The page search process of FIG. 6 is then implemented after identifying index data that satisfies those conditions. The page search process of FIG. 6 sets the page position so the document edit program finds the beginning of applicable page position when opening the document. The user can in this way re-open the document for editing, without having to search from the beginning for the location that was last edited.

The process flow in this embodiment is comprised as a program, and the applicable program can be loaded into (read by) a computer.

Examples of this invention were described above, however this invention is not limited by these embodiments and different adaptations and variations are possible. The above described embodiments can be contrived or combined as needed as will be readily apparent to one skilled in the art.

What is claimed is:

1. A device for managing electronic documents comprising:
a display unit that displays an electronic document;
a pen data processor that collects data hand-written by a user with a digital pen on a physical object when viewing a page within the electronic document at a first time point and that forms stroke set data from the collected data, said stroke set data being accumulated in a database;
an index data generator unit that generates a plurality of indices each of which links (i) a symbol string in the page of the electronic document displayed on the display unit with (ii) an order of occurrence of the symbol string in the page of the electronic document as counting from the beginning of the electronic document, and generates a set of index data including said indices, a first time point and an ID of the electronic document;
a storage unit that stores the generated index data;
an index data search unit that searches the storage unit for a set of index data matching with input search conditions; and
a page search unit that searches for the page within the electronic document with matching index data by searching the symbol strings of the matching index data within said electronic document and identifying positions of said symbol strings appearing in an order of occurrence linked with said symbol strings within said electronic document, and searches for a page within said electronic document containing maximum numbers of matching pairs of said symbol strings and said orders of occurrence,
wherein the page search unit searches at a second time point for the page of the electronic document and the stroke set data formed from the data hand-written by the user at the first time point, the second time point is later than the first time point, and
the display unit displays the searched page.

2. A device for managing electronic documents according to claim 1, wherein the page search unit searches for the page containing the most symbol strings.

3. A device for managing electronic documents according to claim 1, wherein stroke set data instructions from the digital pen are received, and the search conditions are the time information linked to the specified stroke set data.

4. A device for managing electronic documents according to claim 1, wherein the search conditions are index data selected from an index data list displayed on the display unit.

5. A device for managing electronic documents according to claim 1, wherein the search conditions are information on the time that editing of the electronic document ended; and the display unit displays the page that was displayed when editing of the applicable electronic document ended.

6. A device for managing electronic documents according to claim 1, wherein, when multiple identical symbol strings appear in the page displayed on the display unit, the index data generator unit generates index data by utilizing the symbol string appearing at the beginning of the applicable page and the order of occurrence corresponding to that symbol string as the index.

7. A device for managing electronic documents according to claim 1, wherein the index generator unit generates the index data each time the state of the page displayed on the display unit is changed.

8. A device for managing electronic documents according to claim 7, wherein the change in the state of the page is movement of the page within the electronic document by a symbol string search or scrolling the displayed page.

9. A device for managing electronic documents according to claim 7, wherein the change in the state of the page is caused when editing of the electronic document starts or ends.

10. A device for managing electronic documents according to claim 1, further comprising an entry unit, wherein the index data generator unit generates index data when an instruction was entered via the entry unit to store the page displayed on the display unit.

11. A device for managing electronic documents according to claim 1, wherein the index data generator unit selects an index in the order of small frequency of occurrence among the multiple indices that were formed, and generates index data containing the selected index.

12. A device for managing electronic documents according to claim 1, wherein the index data generator unit selects only the index containing the symbol string appearing larger number of times on the displayed page, from among the multiple indices that were formed and generates index data containing the selected index.

13. A device for managing electronic documents according to claim 1, wherein the index data generator unit randomly selects a symbol string appearing on the page displayed in the display unit, and generates index data containing an index made from the selected symbol string.

14. A device for managing electronic documents according to claim 1, wherein the index data contains information on the time that the state of the page displayed on the display unit was changed.

15. A device for managing electronic documents according to claim 1, wherein the set of index data generated for the electronic document further include a number of indices included in the set of index data.

16. A device for managing electronic documents according to claim 1, wherein said symbol string includes at least one symbol of text, audio, or video.

17. A device for managing electronic documents according to claim 1, wherein said physical object is a piece of paper.

18. A device for managing electronic documents according to claim 1, wherein said ID of the electronic document is a URL of the electronic document.

19. A device for managing electronic documents according to claim 1, wherein said input search conditions include the first time point.

20. A software program embedded in a computer readable storage medium and executable by an electronic document management device including a processor, a display unit and a storage unit, comprising:

a module for collecting data hand-written by a user with a digital pen on a physical object when viewing a page within the electronic document at a first time point and that forms stroke set data from the collected data, said stroke set data being accumulated in a database;

a module for generating a plurality of indices each of that links (i) a symbol string in the page of the electronic document displayed on the display unit with (ii) an order of occurrence of the symbol string in the page of the electronic document being a number of times that the symbol string appeared in the electronic document as counting from the beginning of the electronic document to the page, and generating a set of index data containing said indices, a first time point and an ID of the electronic document;

a module for storing the generated index data into the storage unit;

a module for searching the storage unit for a set of index data matching with input search conditions;

a module for searching at a second time point for the stroke set data formed from the data hand-written by the user at the first time point and the page within the electronic document with matching index data by searching the symbol strings of the matching index data within said electronic document and identifying positions of said symbol strings appearing in an order of occurrence linked with said symbol strings within said electronic document and searching for a page within said electronic document containing maximum numbers of matching pairs of said symbol strings and said orders of occurrence, the second time point being later than the first time point; and a module for displaying the searched page on the display unit.

21. A system for managing electronic documents including a digital pen and a device for managing electronic documents, wherein the device for managing electronic documents comprises:

a display unit that displays the page of the electronic document;

a pen data processor that collects data hand-written by a user with the digital pen on a physical object when viewing a page within the electronic document at a first time point and that forms stroke set data from the collected data, said stroke set data being accumulated in a database;

an index data generator unit that generates a plurality of indices each of which links (i) a symbol string in the page of the electronic document displayed on the display unit with (ii) an order of occurrence of the symbol string in the page of the electronic document as counting from the beginning of the electronic document, and generates a set of index data including said indices and the first time point;

a storage unit that stores the generated index data, wherein the digital pen sends second time information to the device for managing electronic documents, wherein the device for managing electronic documents further comprises:

an index data search unit that searches for a set of index data from the storage unit based on the received first time information and the second time information; and a page search unit that searches for the page within the electronic document with matching index data within said electronic document and identifying positions of said symbol strings appearing in an order of occurrence linked with said symbol strings within said electronic document, and searches for a page within said electronic document containing maximum numbers of matching pairs of said symbol strings and said orders of occurrence, and wherein the page search unit searches at a second time point contained in the second time information for the page of the electronic document and the stroke set data formed from the data hand-written by the user at the first time point, the second time point is later than the first time point, and the display unit displays the searched page.

* * * * *